(12) United States Patent
Zeng et al.

(10) Patent No.: US 11,727,784 B2
(45) Date of Patent: Aug. 15, 2023

(54) MASK WEARING STATUS ALARMING METHOD, MOBILE DEVICE AND COMPUTER READABLE STORAGE MEDIUM

(71) Applicant: UBTECH ROBOTICS CORP LTD, Shenzhen (CN)

(72) Inventors: Yusheng Zeng, Shenzhen (CN); Yepeng Liu, Shenzhen (CN); Jun Cheng, Shenzhen (CN); Jianxin Pang, Shenzhen (CN); Youjun Xiong, Shenzhen (CN)

(73) Assignee: UBTECH ROBOTICS CORP LTD, Pasadena, CA (US)

( * ) Notice: Subject to any disclaimer, the term of this patent is extended or adjusted under 35 U.S.C. 154(b) by 371 days.

(21) Appl. No.: 17/138,944

(22) Filed: Dec. 31, 2020

(65) Prior Publication Data
US 2022/0068109 A1  Mar. 3, 2022

(30) Foreign Application Priority Data
Aug. 26, 2020  (CN) .......................... 202010870845.1

(51) Int. Cl.
| | | |
|---|---|---|
| *G06K 9/00* | (2022.01) | |
| *G06F 21/32* | (2013.01) | |
| *G06K 9/62* | (2022.01) | |
| *G08B 21/18* | (2006.01) | |
| *G06T 7/70* | (2017.01) | |
| *G06V 40/16* | (2022.01) | |

(52) U.S. Cl.
CPC ................ *G08B 21/18* (2013.01); *G06T 7/70* (2017.01); *G06V 40/165* (2022.01); *G06T 2207/30201* (2013.01)

(58) Field of Classification Search
CPC ... G08B 21/18; G06T 7/70; G06T 227/30201; G06V 40/165; G06K 9/00; G06K 9/62; G06F 21/12
See application file for complete search history.

(56) References Cited

U.S. PATENT DOCUMENTS

| | | | | |
|---|---|---|---|---|
| 10,019,631 | B2 * | 7/2018 | Tao | G06V 20/48 |
| 10,748,322 | B1 * | 8/2020 | Pishevar | G06T 11/00 |
| 10,846,857 | B1 * | 11/2020 | Graves | G06V 40/172 |
| 11,235,182 | B2 * | 2/2022 | Wang | A41D 13/11 |
| 11,357,411 | B2 * | 6/2022 | Lev | A61B 5/4836 |
| 11,361,445 | B2 * | 6/2022 | Lev | G06T 7/136 |

(Continued)

*Primary Examiner* — Hai Phan
*Assistant Examiner* — Son M Tang

(57) ABSTRACT

A mask wearing status alarming method, a mobile device, and a computer readable storage medium are provided. The method includes: performing a face detection on an image to determine face areas each including a target determined as a face; determining a mask wearing status of the target in each face area; confirming the mask wearing status of the target in each face area using a trained face confirmation model to remove the face areas comprising the target being mistakenly determined as the face and determining a face pose in each of the remaining face areas to remove the face areas with the face pose not meeting a preset condition, in response to determining the mask wearing status as a not-masked-well status or a unmasked status; and releasing an alert corresponding to the mask wearing status of the target in each of the remaining face areas.

18 Claims, 10 Drawing Sheets

(56) References Cited

U.S. PATENT DOCUMENTS

| | | | |
|---|---|---|---|
| 2002/0012454 A1* | 1/2002 | Liu | G06V 40/171; 375/E7.263 |
| 2006/0222213 A1* | 10/2006 | Kiyohara | G07C 9/00; 382/103 |
| 2007/0031032 A1* | 2/2007 | Oh | G06T 7/11; 382/167 |
| 2007/0237421 A1* | 10/2007 | Luo | G06T 11/60; 382/284 |
| 2008/0212879 A1* | 9/2008 | Torii | H04N 23/611; 382/195 |
| 2010/0177981 A1* | 7/2010 | Wang | G06V 40/162; 382/260 |
| 2010/0265354 A1* | 10/2010 | Kameyama | H04N 19/17; 348/222.1 |
| 2011/0150339 A1* | 6/2011 | Kashiwagi | G06V 40/162; 382/190 |
| 2011/0299776 A1* | 12/2011 | Lee | G06V 40/171; 382/173 |
| 2014/0341442 A1* | 11/2014 | Lewis | G06V 40/165; 382/118 |
| 2015/0347822 A1* | 12/2015 | Zhou | G06T 1/0007; 382/118 |
| 2017/0243053 A1* | 8/2017 | Li | G06T 7/143 |
| 2018/0068218 A1* | 3/2018 | Yoo | G06F 18/213 |
| 2018/0205989 A1* | 7/2018 | Srinivasan | G06V 40/161 |
| 2018/0247112 A1* | 8/2018 | Norimatsu | G07C 9/10 |
| 2018/0285630 A1* | 10/2018 | Han | G06F 18/25 |
| 2018/0373924 A1* | 12/2018 | Yoo | G06F 18/217 |
| 2019/0080149 A1* | 3/2019 | Gernoth | G06V 40/166 |
| 2019/0236342 A1* | 8/2019 | Madden | G08B 13/19602 |
| 2019/0294860 A1* | 9/2019 | Jin | G06N 3/045 |
| 2019/0392606 A1* | 12/2019 | Hisada | G06V 20/00 |
| 2020/0012887 A1* | 1/2020 | Li | G06F 18/254 |
| 2020/0050836 A1* | 2/2020 | Gugino | G06T 17/00 |
| 2020/0104570 A1* | 4/2020 | Kumar | H04N 23/56 |
| 2020/0118375 A1* | 4/2020 | Tagawa | G07B 15/00 |
| 2020/0228729 A1* | 7/2020 | Okuno | G06T 7/11 |
| 2021/0106854 A1* | 4/2021 | Shen | A62B 18/08 |
| 2021/0192184 A1* | 6/2021 | Zeng | G06V 10/60 |
| 2022/0012894 A1* | 1/2022 | Lev | G06V 40/166 |
| 2022/0129682 A1* | 4/2022 | Tang | G06V 20/53 |

* cited by examiner

MASK WEARING STATUS ALARMING METHOD, MOBILE DEVICE AND COMPUTER READABLE STORAGE MEDIUM

CROSS REFERENCE TO RELATED APPLICATIONS

The present disclosure claims priority to Chinese Patent Application No. 202010870845.1, filed Aug. 26, 2020, which is hereby incorporated by reference herein as if set forth in its entirety.

BACKGROUND

1. Technical Field

The present disclosure relates to mask recognition technology, and particularly to a mask wearing status alarming method, a mobile device, and a computer readable storage medium.

2. Description of Related Art

When an epidemic occurs, it usually reminds people in public places to wear masks so as to reduce the probability of cross infection.

However, in the existing face detection and mask recognition algorithms, there are some problems in their applications. For example, as to face detection algorithm, in order to implement on mobile terminals, its corresponding face detection model is generally relatively lightweight and prone to false detections, and many false alarms will occur if there is no extra enhancements. In addition, as to mask recognition algorithm, it can only recognize a masked status and an unmasked status, and the corresponding mask recognition model is generally heavier and leads to great challenges when implementing on mobile terminals.

Therefore, it is necessary to propose a method to solve the above-mentioned technical problems.

BRIEF DESCRIPTION OF THE DRAWINGS

To describe the technical schemes in the embodiments of the present disclosure or in the prior art more clearly, the following briefly introduces the drawings required for describing the embodiments or the prior art.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In addition, in the specification and the claims of the present disclosure, the terms "first", "second", and the like in the descriptions are only used for distinguishing, and cannot be understood as indicating or implying relative importance.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in some other embodiments", "in other embodiments" and the like that appear in different places of the specification do not mean that descripted embodiments should be referred by all other embodiments, but instead be referred by "one or more but not all other embodiments" unless otherwise specifically emphasized. The terms "including", "comprising", "having" and their variations all mean "including but not limited to" unless otherwise specifically emphasized.

Embodiment One

When an epidemic occurs, it usually reminds people in public places to wear masks so as to reduce the probability of cross infection. However, the existing methods can usually only determine whether a person is wearing a mask or not. In fact, if the user only hangs the mask near the mouth (without covering the mouth and the nose), there is also a risk of spreading or being infected by germs or virus. In addition, the existing methods also have the problems of difficult to implement on mobile devices (e.g., mobile phones or robots) and have more false alarms. In order to solve these problems, a mask wearing status alarming method is provided.

Figure 1:
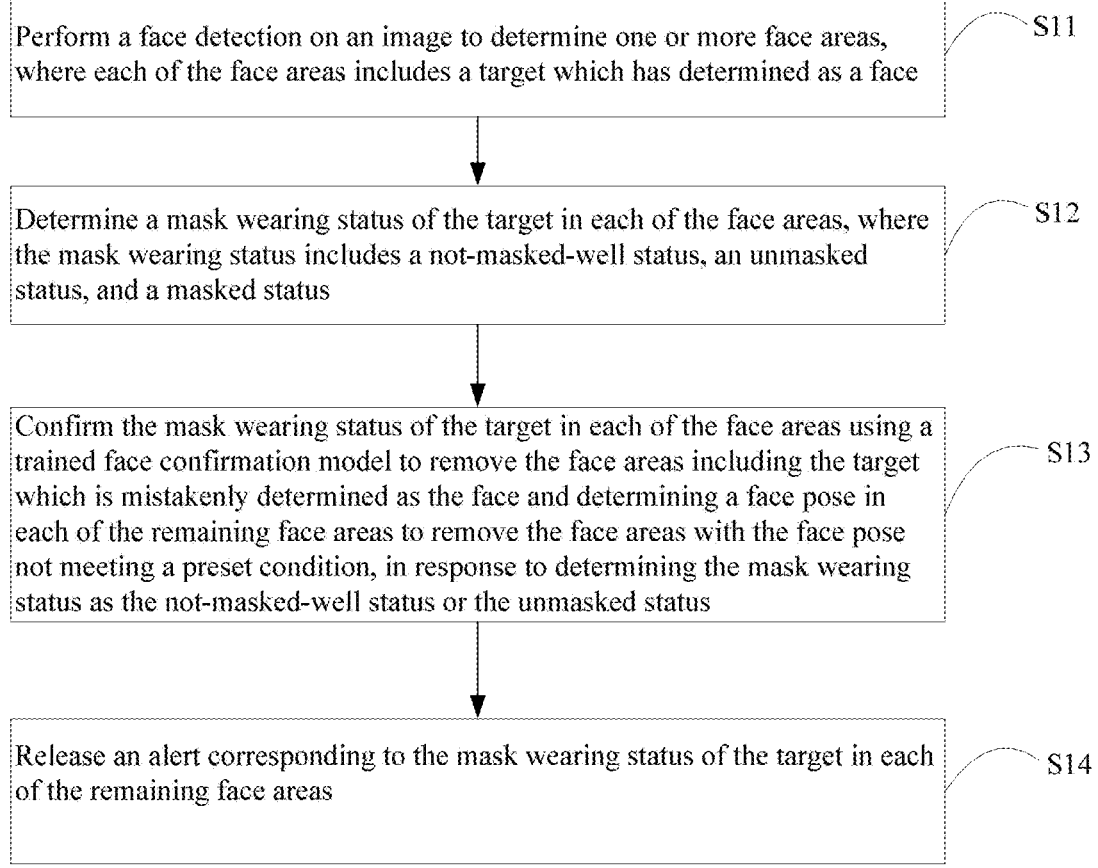
FIG. 1 is a flow chart of a mask wearing status alarming method according to embodiment one of the present disclosure.

FIG. 1 is a flow chart of a mask wearing status alarming method according to embodiment one of the present disclosure. In this embodiment, the mask wearing status method is a computer-implemented method executable for a processor. In one embodiment, the method may be implemented through a mask wearing status alarming apparatus shown in FIG. 9 or a mobile device shown in FIG. 10. As shown in FIG. 1, the method includes the following steps.

S11: performing a face detection on an image to determine one or more face areas, where each of the face areas includes a target which has determined as a face.

In this embodiment, an existing face (e.g., human face) detection algorithm may be used to perform the face detection on the image so as to determine face areas. If there are a plurality of faces in the image, there are also a plurality of face areas.

In some embodiments, the determined face (i.e., the above-mentioned target) can be selected by a graphic frame, and the area in the image that is enclosed by the graphic frame is the face area. After the face is selected, the image with the graphic frame is displayed. In which, the graphic frame can be flexibly determined according to the shape of the face appearing in the image (for example, when the face is shielded, the flexibly determined graphic frame may be a polygonal frame), or it may have a fixed shape. As an example, the graphic frame may be a rectangular frame.

S12: determining a mask wearing status of the target in each of the face areas, where the mask wearing status includes a not-masked-well status, an unmasked status, and a masked status.

Figure 2:
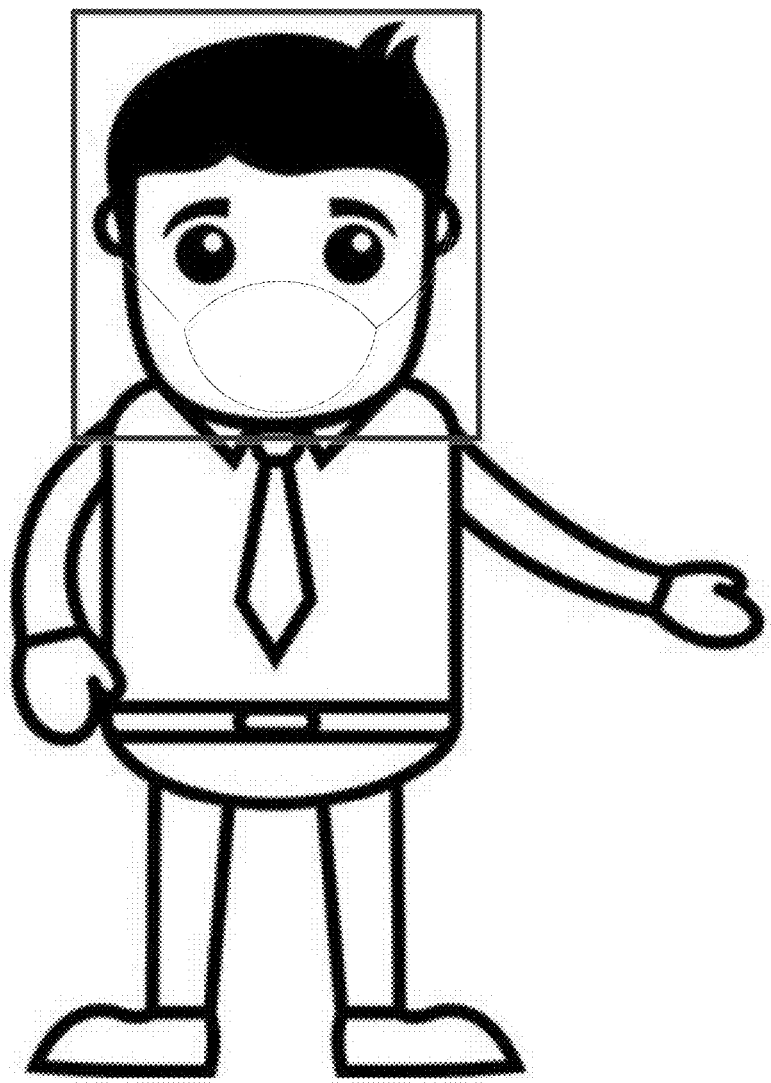
FIG. 2 is a schematic diagram of a mask wearing status of a face being in a masked status according to the embodiment one.
Figure 3:
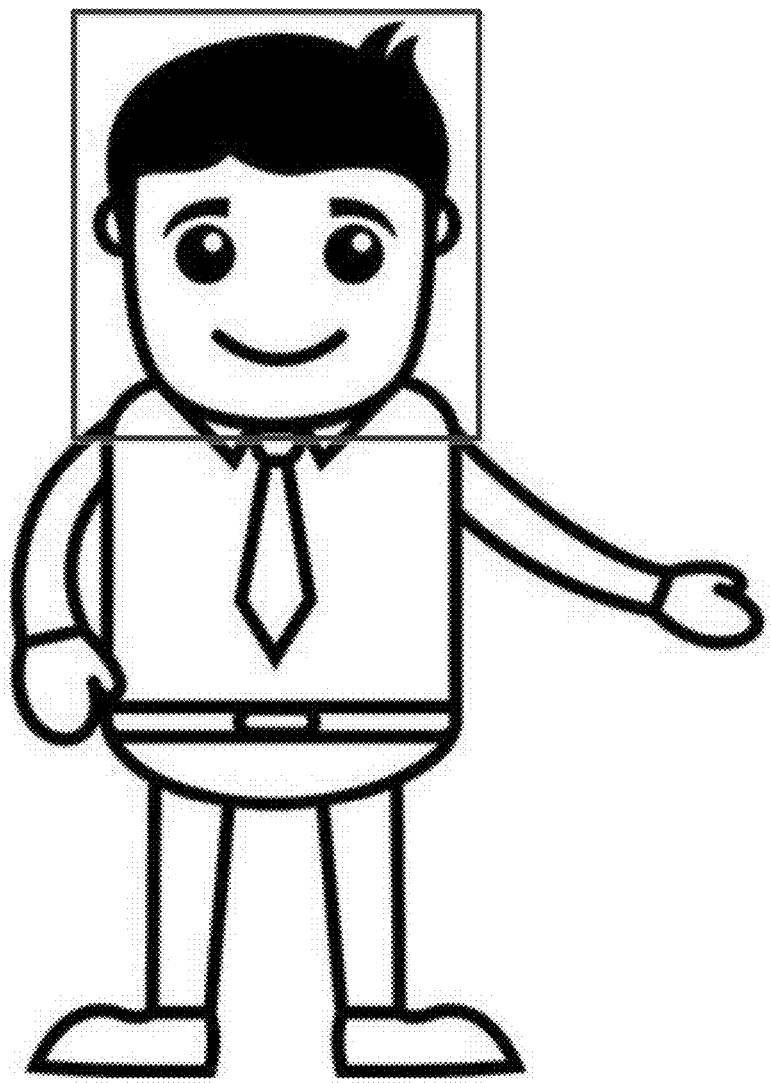
FIG. 3 is a schematic diagram of a mask wearing status of a face being in an unmasked status according to the embodiment one.
Figure 4:
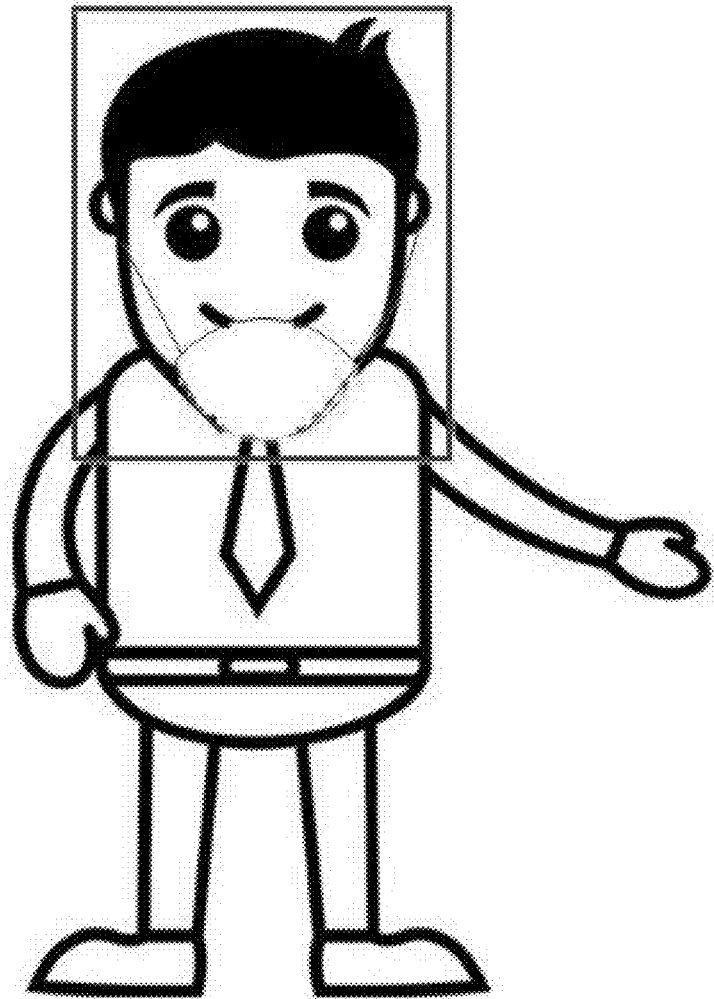
FIG. 4 is a schematic diagram of a mask wearing status of a face being in a not-masked-well status according to the embodiment one.

In this embodiment, the not-masked-well status refers to a state that (the face of) the user wears a mask, but the mask does not simultaneously cover the mouth and nose of (the face of) the user. Referring to FIG. 2, FIG. 3, and FIG. 4, the masked status, the unmasked status, and the not-masked-well status are shown, respectively.

S13: confirming the mask wearing status of the target in each of the face areas using a trained face confirmation model to remove the face areas including the target which is mistakenly determined as the face and determining a face pose in each of the remaining face areas to remove the face areas with the face pose not meeting a preset condition, in response to determining the mask wearing status as the not-masked-well status or the unmasked status; where the trained face confirmation model is a lightweight binary classification model.

Figure 5:
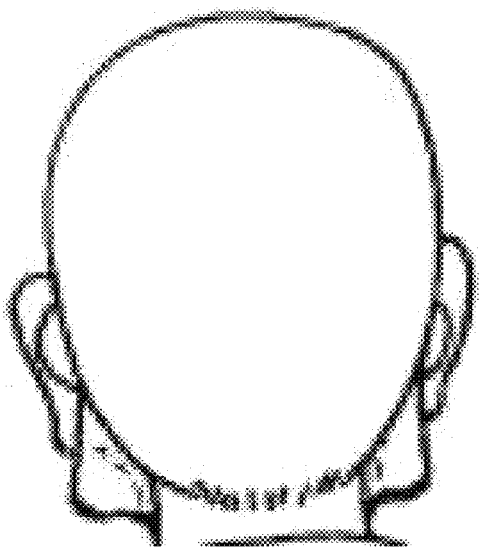
FIG. 5 is a schematic diagram of the back of a head in an image according to the embodiment one.
Figure 6:
FIG. 6 is a schematic diagram of an incomplete detected face in an image according to the embodiment one.
Figure 7:
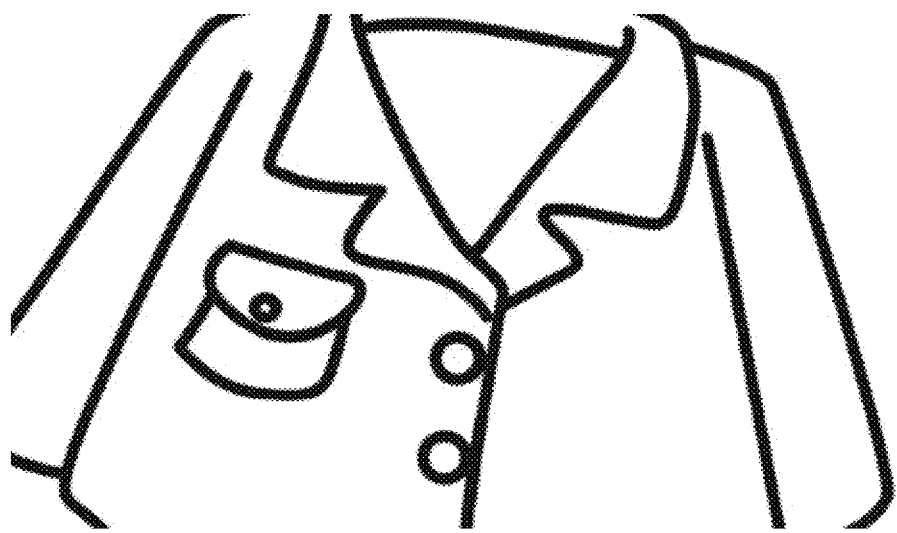
FIG. 7 is a schematic diagram of a cloth in an image according to the embodiment one.

According to analyses, it can be known that the algorithms for face detection that are implemented on mobile terminals often have many false detections, and the contents of the image that are falsely detected as the face may be, in a high probability, the back of a head (see FIG. 5), a hand, an incomplete detected face (see FIG. 6), or a cloth (see FIG. 7, especially when there is a face-like pattern on the cloth), and the contents that are falsely detected as the face are also easily determined as in the unmasked status or the not-masked-well status in the subsequent mask wearing status detection. Therefore, in order to reduce the probability of the subsequent false alarms for the mask wearing status, a lightweight binary classification face confirmation model is used to filter the main non-face information. For example, in order to make the initial face confirmation model to converge by training, normal faces are used as the positive samples, and the common false detection objectives such as the back of a head, a hand, an incomplete detected face, or a cloth are used as the negative samples, and the ratio of the positive samples to the negative samples is kept as larger than 0.5 and less than or equal to 1, for example, the ratio of the positive samples to the negative samples can be 1:1.5. In some embodiments, the extremely lightweight classification network called "shufflenetv2×0.25" can be used for training (in which, v2 means the second version, and 0.25 means that the network structure is reduced by 0.25 times on the basis of the second version), and a good effect can be achieved. In which, it can achieve real-time confirmation of the face, and can effectively filter out more than 99% of false detections, and is very practical.

S14: releasing an alert corresponding to the mask wearing status of the target in each of the remaining face areas.

In which, the alert corresponding to the mask wearing status may be at least one of, for example, reporting the mask wearing status of the target (i.e., the face) in each of the remaining face areas, and marking the mask wearing status on the target in each of the remaining face areas through a preset mark (e.g., texts and a specific symbol). As an example, it may mark the mask wearing status of the face (i.e., the above-mentioned target) by texts displayed near the graphic frame which selects the corresponding face area.

In this embodiment, the face detection is performed on the image first, and the one or more face areas are determined, then the mask wearing status of the target (i.e., the face) in each of the face areas is determined. Since the mask wearing status includes the not-masked-well status, the unmasked status, and the masked status, it can further distinguish whether the mask wearing status of the target is the not-masked-well status, so that the determined mask wearing status is more accurate. At the same time, when the mask wearing status is the not-masked-well status or the unmasked status, the mask wearing status of the target (i.e., the face in the not-masked-well status or the unmasked status) in each of the face areas is confirmed using the trained face confirmation model. The alert corresponding to the mask wearing status of the target in each of the remaining face areas will only be released after the face areas including the target which is mistakenly determined as the face are removed and the face areas with the face pose not meeting the preset condition are removed, that is, the mask wearing status of the target in each of the face areas is confirmed, hence it can avoid releasing the alert for the target mistakenly determined as the face, thereby reducing the number of false alarms. In addition, because the trained face confirmation model is a lightweight binary classification model, it occupies less memory, thereby reducing the difficulty of implementing on mobile terminals.

In other embodiment, when it needs to determine the mask wearing status of different faces in a video, face tracking technology can be utilized to identify whether the faces (the face is the above-mentioned target) in different frames (i.e., images) of the video are the detected faces, that is, step S12 may include:

taking the confirmed mask wearing status of the target in the face area including the target with the confirmed mask wearing status as the mask wearing status of the target in each of the face areas, in response to the face of the target in the face area being the same as the face of the target in the face area including the target with the confirmed mask wearing status.

In some embodiments, since the user may take off the mask subsequently, in order to be able to prompt the user to wear the mask in time, the mask wearing status of the detected face needs to be updated in time. That is, if the face in the face area is the same as the detected face, the mask wearing status corresponding to the detected face is taken as the mask wearing status of the face in the face area. As an example, if the face in the face area is the same as the detected face, and the number of frames between the current frame and the last frame having performed the mask wearing status recognition is less than a preset interval frame number threshold, the mask wearing status corresponding to the detected face is taken as the mask wearing status of the face in the face area, and if the number of frames between the current image and the last image having performed the mask wearing status recognition is equal to the preset interval frame number threshold, the mask wearing status of the face in the face area is determined through a trained mask recognition network model, and the mask wearing status of the face is taken as the mask wearing status of the detected face, thereby realizing timely update of the mask wearing status.

In this embodiment, since the mask wearing status of the detected face is re-recognized every preset interval frame number threshold, it can be detected in time whether the user not welly wear the mask subsequently, thereby realizing timely alarm of the mask wearing status.

In some embodiments, after the step of releasing the alert corresponding to the mask wearing status of the target in each of the remaining face areas, the method further includes:

returning to the step of confirming the mask wearing status of the target in each of the face areas in response to the face of the target in the face area being different from the face of the target in the face area including the target with the confirmed mask wearing status, and storing the confirmed mask wearing status.

In this embodiment, a plurality of samples for the not-masked-well status, the unmasked status, and the masked status are first obtained, then the obtained samples are used to train the initial mask recognition network model. If the result output by the trained initial mask recognition network model meets a requirement (e.g., convergence or the accuracy is larger than or equal to a preset accuracy threshold), the training is stopped, and the trained mask recognition network model is obtained. Then the image with the face area is input into the trained mask recognition network model to obtain the mask wearing status of the face that is output by the trained mask recognition network model.

In some embodiments, the mask recognition network model can be obtained by adjusting the face recognition model called "mobileface". The mask recognition network model has a network structure of 64*64. After testing, it can be known that, the accuracy of the mask wearing status that is recognized through the network structure of 64*64 is basically the same as the accuracy of the mask wearing status that is recognized through the network structure of 112*112, while the network structure of 64*64 is lighter and its calculation speed is faster. The network structure of the mask recognition network model is shown in Table 1.

TABLE 1

| Input | Operator | t | c | n | s |
|---|---|---|---|---|---|
| 64, 64, 3 | conv3 * 3 | — | 64 | 1 | 1 |
| 64, 64, 64 | Depthwise conv3 * 3 | — | 64 | 1 | 1 |
| 64, 64, 64 | bottleneck | 2 | 64 | 5 | 2 |
| 31, 31, 64 | bottleneck | 4 | 128 | 1 | 2 |
| 15, 15, 128 | bottleneck | 2 | 128 | 6 | 1 |
| 15, 15, 128 | bottleneck | 4 | 128 | 1 | 2 |
| 7, 7, 128 | bottleneck | 2 | 128 | 2 | 1 |
| 7, 7, 128 | conv1 * 1 | — | 512 | 1 | 1 |
| 7, 7, 512 | Linear GDconv7 * 7 | — | 512 | 1 | 1 |
| 1, 1, 512 | Linear conv1 * 1 | — | X | 1 | 1 |

In which, the three values in "Input" represent the values of three channel corresponding to the input RGB, "Operator" represents the operation, "conv" in "Operator" represents convolution operation, "Depthwise conv" represents deep convolution operation, "bottleneck" represents residual operation, "Linear" in "GDconv Linear" represents activation function, "GDconv" represents global convolution, "t" represents the transposed amplification factor in the residual operation "bottleneck", "c" represents the number of the channels of the convolution kernel which affects the value of the rightmost channel in the next input, for example, c=64 in the first line, and the value of the rightmost channel in the input of the second line becomes 64, and the "X" in "c" represents the number of categories. In this embodiment, since the mask wearing status includes three states, "X" can be 3, "n" represents the number of the repetitions of "Operator", and "s" represents the stride.

In some embodiments, before recognizing the mask wearing status of the face, the face area obtained by the face detection is moved down first to facilitate the subsequent recognition that determines whether the face is at the masked status or the not-masked-well status. At this time, before the returning to the step of confirming the mask wearing status of the target in each of the face areas, the method further includes:

determining one or more new face areas, and determining a mask wearing status of a target in each of the new face areas. In which, each of the new face areas is (x, y+h*C, w, h), and each of the original face areas is (x, y, w, h), where x and y are the coordinates of pixel, w is the width of the image, h is the height of the image, and C is a preset percentage less than 1.

In this embodiment, considering that the general face detection only detects the face areas, while the mask worn by the user is at the lower half of the face of the user, in order to obtain a more accurate recognition result of the mask wearing status, it needs to obtain a more comprehensive mask information to distinguish whether the covering of the mouth and nose is a mask or a silk scarves. For example, the face area can be pulled down to obtain a new face area, and the mask wearing status of the new face area can be recognized.

In some embodiments, considering that the mask may be worn at the position up to around the eyes, by taking the human eye as the boundary, the ratio of the upper part of the face to the lower part of the face is about 1:2. Hence, the ratio C of the downward shift of the new face area with respect to the original face area should preferably not exceed 40%, for example, C may be 10%.

The recognition accuracy of the mask wearing status of the face is related to the direction of the face in the image (e.g., whether the face in the image is the front face or the side face), that is, the accuracy of the recognition result of the mask wearing status of the face in the image that positively faces the camera will be higher than that obliquely faces the camera. In other words, the accuracy of the recognition result of the mask wearing status is related to the posture of the face. At this time, in order to improve the recognition accuracy of the mask wearing status, in step S13, the face pose in each of the remaining face areas is determined, and the face areas with the face pose not meeting the preset condition is removed.

In this embodiment, the pose of the face can be analyzed through face landmarks, for example, determining the pose of the face by comparing the two-dimensional face landmarks (or two-dimensional key points) of the face with a three-dimensional standard template.

In some embodiments, the pose of the face can also be determined by analyzing the changes in the ratio of the face landmarks of the front face to the side face. In which, the face landmarks of the face can be obtained after the face detection, and the face face landmarks may include at least one of: 2 face landmarks corresponding to 2 eyes, 1 face landmark corresponding to the nose, and 2 face landmarks corresponding to the mouth.

In some embodiments, the step of determining the face pose in each of the remaining face areas to remove the face areas with the face pose not meeting the preset condition includes: determining a first face landmark, a second face landmark, and a third face landmark of the face, where a straight line on which the first face landmark or the second face landmark is located is parallel to a horizontal plane, and the third face landmark is not on the straight line;

Whether the pose of the face meets the preset conditions can be determine by:

determining the face pose as meeting the preset condition in response to d1/d2 being within a preset range, where d1 is the distance between the first face landmark and the second face landmark, and d2 is the distance between the first face landmark and the third face landmark or the distance between the second face landmark and the third face landmark; and determining the face pose as not meeting the preset condition, in response to d1/d2 being not within the preset range.

According to analyses, during the face is rotated from the front face to the side face, the distance between the 2 face landmarks corresponding to the 2 eyes decreases and the distance between the 2 face landmarks corresponding to the mouth decreases, while the distance between the face landmarks corresponding to the eyes and the face landmark corresponding to the nose (or the face landmarks corresponding to the mouth) remains basically unchanged. Hence, in this embodiment, 3 face landmarks are selected, and among the 3 face landmarks, there is a straight line at which 2 face landmarks are located that is parallel to a horizontal plane (for example, 2 face landmarks corresponding to 2 eyes, or 2 face landmarks corresponding to mouth), and the remaining 1 face landmark is not located at the straight line, that is, the remaining 1 face landmark can select the face landmark corresponding to the nose.

In this embodiment, since the 3 face landmarks can be obtained after the face detection, and the calculation of d1/d2 is simple, the faces that do not meet the preset conditions can be quickly filtered out using the value of d1/d2. Assuming that d1 represents the distance between the 2 face landmarks corresponding to the 2 eyes, and d2 represents the distance from one of the eyes to the mouth, then the face angle (that is, the included angle between the plane where the detected face is located and the plane where the front face is located) corresponding to d1/d2 is as shown in Table 2:

TABLE 2

| | Face Angle a (°) | | | |
|---|---|---|---|---|
| | <10 | 10 < a < 30 | 30 < a < 60 | 60 < a < 90 |
| d1/d2 | 1.2-1.5 | 0.95-1.2 | 0.55-0.95 | <0.55 |

According to the statistical data in Table 2, the face angle is related to the value of d1/d2, hence a preset range corresponding to d1/d2 can be determined according to the required face, so as to realize the filtering of face according to the preset range. For example, assuming that the preset range is (1.2, 1.5), if d1/d2=1.3, that is, d1/d2 is within the preset range, it is determined that the pose of the currently detected face meets the preset condition. The face with the face angle larger than 10 degrees, that is, the side face with the excessive rotation angle will be filtered out.

In some embodiments, in order to further filter out unqualified faces and improve the accuracy of the alarm for the mask wearing status, after step S13, the method further includes:

A1: obtaining a pitch angle, a yaw angle and a roll angle of the face of the target in each of the remaining face areas.

In this embodiment, the pitch angle represents the angle at which an object rotates around the x axis, the yaw angle represents the angle at which the object rotates around the y axis, and the roll angle represents the angle at which the object rotates around the z axis.

A2: comparing the obtained pitch angle, yaw angle, and roll angle with a preset standard pitch angle, standard yaw angle, and standard roll angle, respectively, to remove the face areas with the face pose not meeting the preset condition.

The preset standard pitch angle, standard yaw angle and standard roll angle mainly select the corresponding pitch angle, yaw angle and roll angle when the face is close to the front face, which are mainly for filtering out the side faces with excessive face angle.

Figure 8:
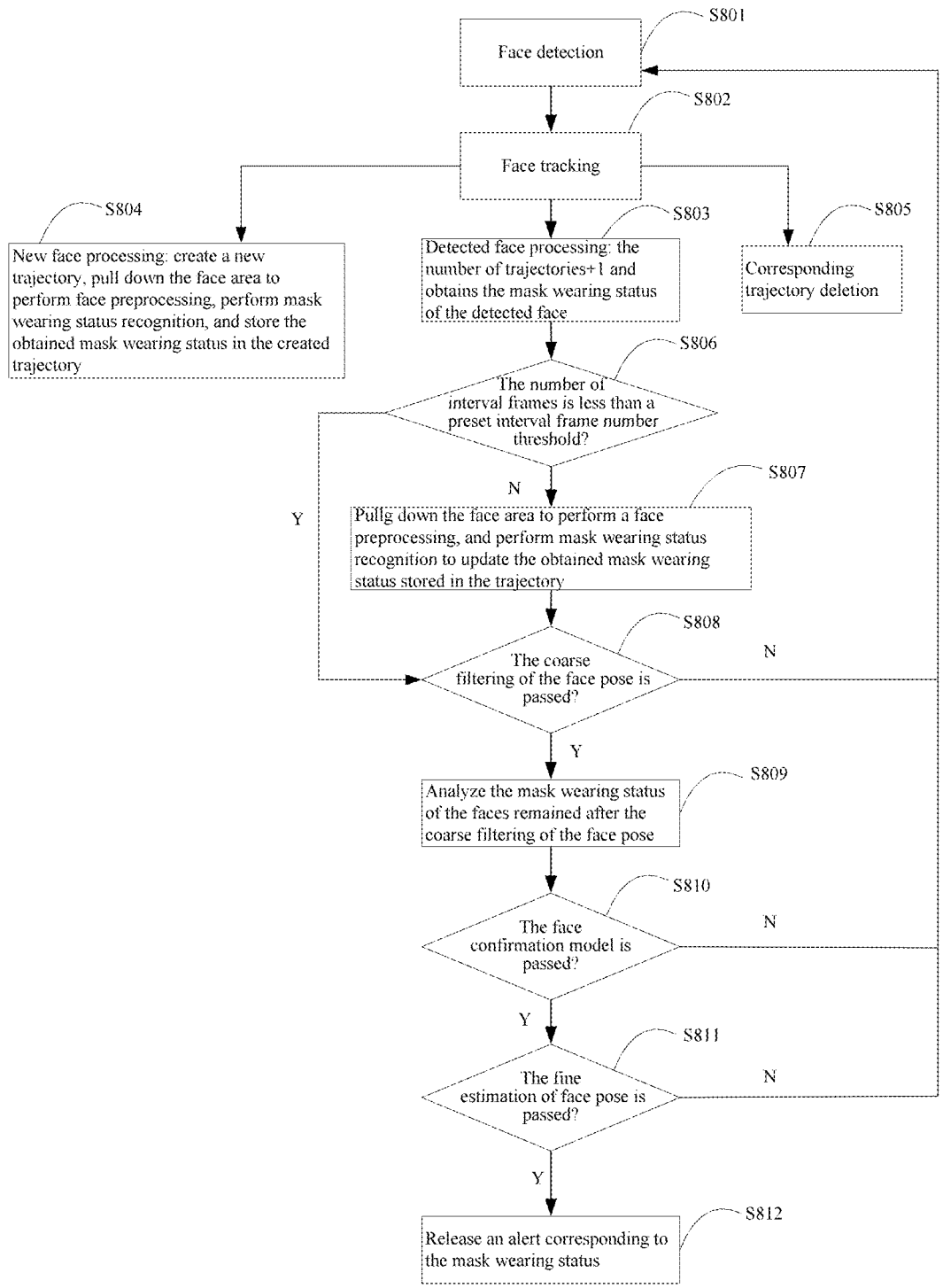
FIG. 8 is a flow chart of another mask wearing status alarming method according to the embodiment one.

FIG. 8 is a flow chart of another mask wearing status alarming method according to the embodiment one. A mask wearing status alarming method based on the mask wearing status alarming method of FIG. 1 is provided. As shown in FIG. 8, the method includes the following steps.

S801: face detection. In which, a face detection is performed on an image to determine one or more face areas, where each of the face areas includes a target which has determined as a face.

S802: face tracking. In which, it identifies whether the face is the detected face by recognizing the ID of the face. If it is the detected face, execute step S803; if it is a new face, execute step S804; and if it is a lost face, execute step S805.

S803: detected face processing. In which, the number of trajectories+1, it obtains the mask wearing status of the detected face, and executes step S806.

S804: new face processing. In which, it creates a new trajectory, pulls down the face area to perform face preprocessing, then performs mask wearing status recognition, and then stores the obtained mask wearing status in the created trajectory.

S805: corresponding trajectory deletion.

S806: determining whether the number of interval frames is less than a preset interval frame number threshold. If so, execute step S808; otherwise, execute step S807.

S807: pulling down the face area to perform a face preprocessing, and performing mask wearing status recognition to update the obtained mask wearing status stored in the trajectory.

S808: determining whether the coarse filtering of the face pose is passed, that is, determining whether d1/d2 is within the preset range. If not, return to step S801, otherwise, execute step S809.

S809: analyzing the mask wearing status of the faces remained after the coarse filtering of the face pose. If it is the masked status, execute step S812; and if it is the unmasked status or the not-masked-well status, execute step S810.

S810: determining whether the face confirmation model is passed. If not, return to step S801; otherwise, execute step S811.

S811: determining whether the fine estimation of face pose is passed, that is, it is determined whether the fine estimation of face posture is passed by comparing the preset standard pitch angle, standard yaw angle, and standard roll angle with the pitch angle, yaw angle, and roll angle of the target. If so, execute step S812, otherwise, return to step S801.

S812: releasing an alert corresponding to the mask wearing status.

It should be understood that, the sequence of the serial number of the steps in the above-mentioned embodiments does not mean the execution order while the execution order of each process should be determined by its function and internal logic, which should not be taken as any limitation to the implementation process of the embodiments.

Embodiment Two

Figure 9:
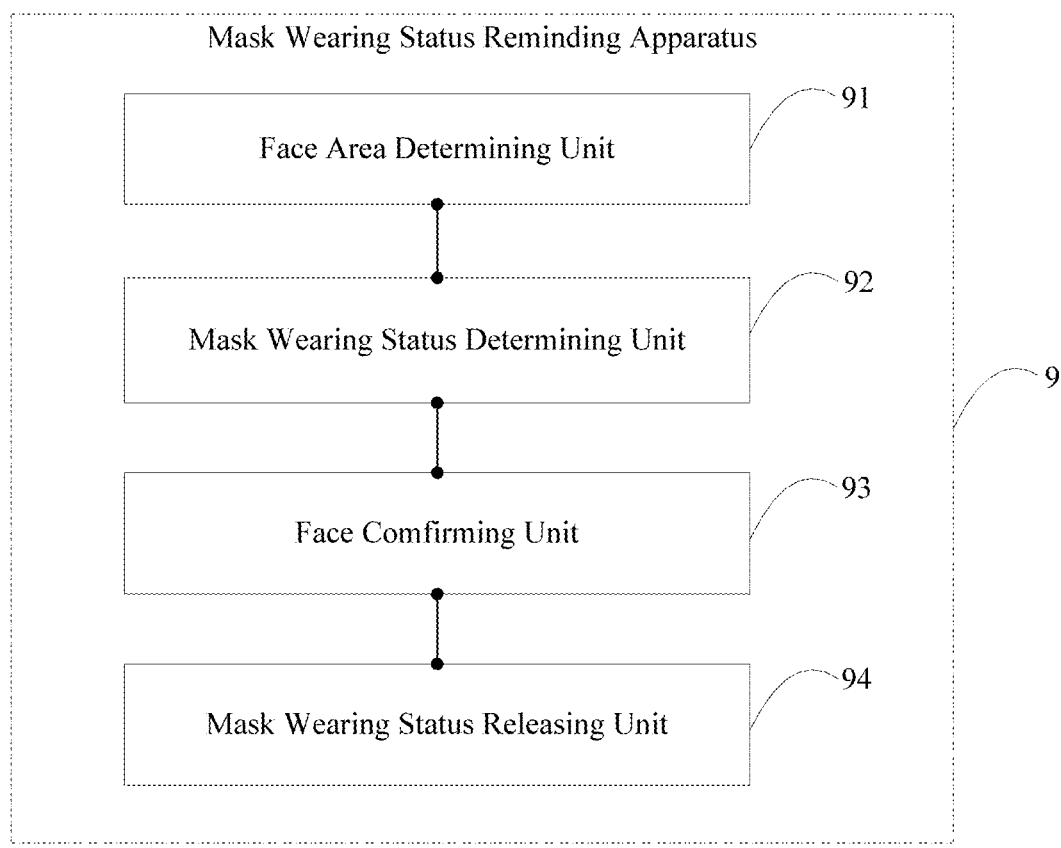
FIG. 9 is a schematic block diagram of a mask wearing status alarming apparatus according to embodiment two of the present disclosure.

FIG. 9 is a schematic block diagram of a mask wearing status alarming apparatus according to embodiment two of the present disclosure. In this embodiment, a mask wearing status alarming apparatus 9 corresponding to the mask wearing status alarming method described in embodiment one is provided. For ease of description, only the parts related to this embodiment are shown.

As shown in FIG. 9, the mask wearing status alarming apparatus 9 includes a face area determining unit 91, a mask wearing status determining unit 92, a face confirming unit 93, and a mask wearing status releasing unit 94. In which:

the face area determining unit 91 is configured to perform a face detection on an image to determine one or more face areas, where each of the face areas includes a target determined as a face;

the mask wearing status 92 determining unit is configured to determine a mask wearing status of the target in each of the face areas, where the mask wearing status includes a not-masked-well status, an unmasked status, and a masked status;

the face confirming unit 93 is configured to confirm the mask wearing status of the target in each of the face areas using a trained face confirmation model to remove the face areas including the target being mistakenly determined as the face and determining a face pose in each of the remaining face areas to remove the face areas with the face pose not meeting a preset condition, in response to determining the mask wearing status as the not-masked-well status or the unmasked status; where the trained face confirmation model is a lightweight binary classification model; and the mask wearing status releasing unit 94 is configured to release an alert corresponding to the mask wearing status of the target in each of the remaining face areas.

In this embodiment, since the mask wearing status includes the not-masked-well status, the unmasked status, and the masked status, it can further distinguish whether the mask wearing status of the target (i.e., the face) is the not-masked-well status, so that the determined mask wearing status is more accurate. At the same time, when the mask wearing status is the not-masked-well status or the unmasked status, the mask wearing status of the target (i.e., the face in the not-masked-well status or the unmasked status) in each of the face areas is confirmed using the trained face confirmation model. The alert corresponding to the mask wearing status of the target in each of the remaining face areas will only be released after the face areas including the target which is mistakenly determined as the face are removed and the face areas with the face pose not meeting the preset condition are removed, that is, the mask wearing status of the target in each of the face areas is confirmed, hence it can avoid releasing the alert for the target mistakenly determined as the face, thereby reducing the number of false alarms. In addition, because the trained face confirmation model is a lightweight binary classification model, it occupies less memory, thereby reducing the difficulty of implementing on mobile terminals.

In some embodiments, the mask wearing status determining unit 92 is s configured to:

take the confirmed mask wearing status of the target in the face area including the target with the confirmed mask wearing status as the mask wearing status of the target in each of the face areas, in response to the face of the target in the face area being the same as the face of the target in the face area including the target with the confirmed mask wearing status.

In some embodiments, since the user may take off the mask subsequently, in order to be able to prompt the user to wear the mask in time, the mask wearing status of the detected face needs to be updated in time. That is, if the face in the face area is the same as the detected face, the mask wearing status determining unit 92 takes the mask wearing status corresponding to the detected face as the mask wearing status of the face in the face area. In this embodiment, if the face in the face area is the same as the detected face, and the number of frames between the current frame and the last frame having performed the mask wearing status alarming method is less than a preset interval frame number threshold, the mask wearing status corresponding to the detected face is taken as the mask wearing status of the face in the face area, and if the number of frames between the current image and the last image having performed the mask wearing status alarming method is equal to the preset interval frame number threshold, the mask wearing status of the face in the face area is determined through a trained mask recognition network model, and the mask wearing status of the face is taken as the mask wearing status of the detected face, thereby realizing timely update of mask wearing status.

In some embodiments, the mask wearing status alarming apparatus 9 further includes:

a mask wearing status storage unit configured to return to confirm the mask wearing status of the target in each of the face areas in response to the face of the target in the face area being different from the face of the target in the face area including the target with the confirmed mask wearing status, and store the confirmed mask wearing status.

In some embodiments, before recognizing the mask wearing status of the face, the face area obtained by the face detection is moved down first to facilitate the subsequent recognition that determines whether the face is at the masked status or the not-masked-well status. Correspondingly, the mask wearing status storage unit can be configured to:

determine one or more new face areas, and determine a mask wearing status of a target in each of the new face areas. In which, each of the new face areas is (x, y+h*C, w, h), and each of the original face areas is (x, y, w, h), where x and y are the coordinates of pixel, w is the width of the image, h is the height of the image, and C is a preset percentage less than 1.

In some embodiments, the determining the face pose in each of the remaining face areas to remove the face areas with the face pose not meeting the preset condition includes: determining a first face landmark, a second face landmark, and a third face landmark of the face, where a straight line on which the first face landmark or the second face landmark is located is parallel to a horizontal plane, and the third face landmark is not on the straight line;

Whether the posture of the face meets the preset conditions is determine by:

determining the face pose as meeting the preset condition in response to d1/d2 being within a preset range, where d1 is the distance between the first face landmark and the second face landmark, and d2 is the distance between the first face landmark and the third face landmark or the distance between the second face landmark and the third face landmark; and determining the face pose as not meeting the preset condition, in response to d1/d2 being not within the preset range.

In some embodiments, the mask wearing status alarming apparatus 9 further includes:

a posture angle obtaining unit configured to obtain a pitch angle, a yaw angle and a roll angle of the face of the target in each of the remaining face areas.

a target face filtering unit configured to compare the obtained pitch angle, yaw angle, and roll angle with a preset standard pitch angle, standard yaw angle, and standard roll angle, respectively, to remove the face areas with the face pose not meeting the preset condition.

It should be noted that, the information exchange, execution process, and the like among the above-mentioned devices/units are based on the same concept as embodiment one, and their functions and technical effects can be found in embodiment one, which will not be repeated herein.

Embodiment Three

Figure 10:
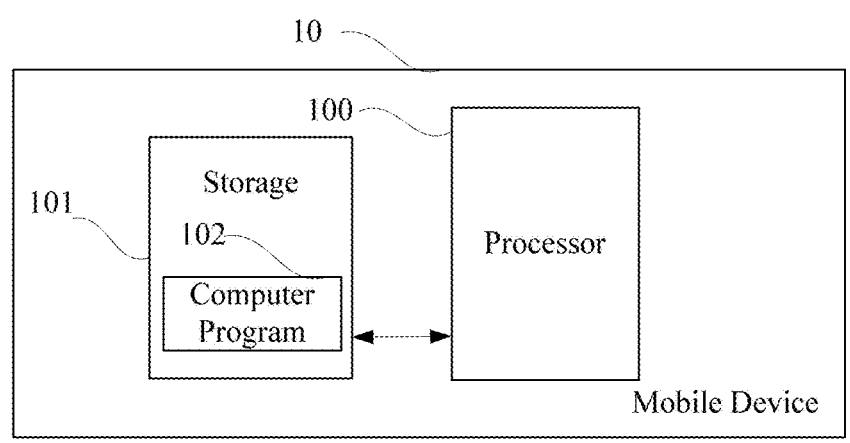
FIG. 10 is a schematic block diagram of a mobile device according to embodiment three of the present disclosure.

FIG. 10 is a schematic block diagram of a mobile device according to embodiment three of the present disclosure. In this embodiment, a mobile device 10 is provided. As shown in FIG. 10, the mobile device 10 includes at least a processor 100 (only one processor is shown in FIG. 10), a storage 101, and a computer program 102 stored in the storage 101 and executable on the processor 100. When executing (instructions in) the computer program 102, the processor 100 implements the steps in embodiment one:

performing a face detection on an image to determine one or more face areas, where each of the face areas includes a target determined as a face;

determining a mask wearing status of the target in each of the face areas, where the mask wearing status includes a not-masked-well status, an unmasked status, and a masked status;

confirming the mask wearing status of the target in each of the face areas using a trained face confirmation model to remove the face areas including the target being mistakenly determined as the face and determining a face pose in each of the remaining face areas to remove the face areas with the face pose not meeting a preset condition, in response to determining the mask wearing status as the not-masked-well status or the unmasked status; where the trained face confirmation model is a lightweight binary classification model; and releasing an alert corresponding to the mask wearing status of the target in each of the remaining face areas.

Furthermore, the processor 100 may further implement other steps in embodiment one.

The mobile device 10 may be a computing device such as a desktop computer, a notebook computer, a tablet computer, and a cloud server. The mobile device 10 may include, but is not limited to, the processor 100 and the storage 101. It can be understood by those skilled in the art that FIG. 10 is merely an example of the mobile device 10 and does not constitute a limitation on the mobile device 10, and may include more or fewer components than those shown in the figure, or a combination of some components or different components. For example, the mobile device 10 may further include an input/output device, a network access device, and the like.

The processor 100 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

In some embodiments, the storage 101 may be an internal storage unit of the mobile device 10, for example, a hard disk or a memory of the mobile device 10. In other embodiments, the storage 101 may also be an external storage device of the mobile device 10, for example, a plug-in hard disk, a smart media card (SMC), a secure digital (SD) card, flash card, and the like, which is equipped on the mobile device 10. Furthermore, the storage 101 may further include both an internal storage unit and an external storage device, of the mobile device 10. The storage 101 is configured to store operating system, application program, boot loader, data, and other program such as codes of a computer program. The storage 101 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A network device is further provided. The network device includes at least one processor, a memory, and a computer program stored in the memory and executable on the at least one processor. The processor implements the steps in any of the foregoing method embodiments when executes the computer program.

A non-transitory computer readable storage medium is further provided. The computer readable storage medium stores a computer program. When the computer program is executed by a processor, the steps in the foregoing method embodiments can be implemented.

A computer program product is further provided. When the computer program product is executed on a mobile device, the mobile device can be implement the steps in the foregoing method embodiment.

When the integrated unit is implemented in the form of a software functional unit and is sold or used as an independent product, the integrated unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include at least any primitive or device capable of carrying the computer program codes in the mobile device, a recording medium, a computer memory, a read-only memory (ROM), a random access memory (RAM), electric carrier signals, telecommunication signals and software distribution media, for example, a USB flash drive, a portable hard disk, a magnetic disk, an optical disk, and the like. In some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/mobile device and method may be implemented in other manners. For example, the above-mentioned apparatus/mobile device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented mask wearing status alarming method for a humanoid robot, comprising steps of:
    performing a face detection on an image to determine one or more face areas, wherein each of the face areas comprises a target determined as a face;
    determining a mask wearing status of the target in each of the face areas, wherein the mask wearing status comprises a not-masked-well status, an unmasked status, and a masked status;
    confirming the mask wearing status of the target in each of the face areas using a trained face confirmation model to remove the face areas comprising the target being mistakenly determined as the face and determining a face pose in each of the remaining face areas to remove the face areas with the face pose not meeting a preset condition, in response to determining the mask wearing status as the not-masked-well status or the unmasked status; wherein the trained face confirmation model is a lightweight binary classification model; and
    releasing an alert corresponding to the mask wearing status of the target in each of the remaining face areas;
    wherein after the step of releasing the alert corresponding to the mask wearing status of the target in each of the remaining face areas, the method further comprises:
        returning to the step of confirming the mask wearing status of the target in each of the face areas in response to the face of the target in the face area being different from the face of the target in the face area comprising the target with the confirmed mask wearing status, and storing the confirmed mask wearing status; and
    wherein before the step of returning to the step of confirming the mask wearing status of the target in each of the face areas, the method further comprises:
        determining one or more new face areas, and determining a mask wearing status of a target in each of the new face areas through a trained mask recognition network model, wherein each of the new face areas is (x, y+h*C, w, h), each of the original face areas is (x, y, w, h), x and y are the coordinates of pixel, w is the width of the image, h is the height of the image, and C is a preset percentage less than 1.

2. The method of claim 1, wherein the step of determining the face pose in each of the remaining face areas to remove the face areas with the face pose not meeting the preset condition comprises:
    determining a first face landmark, a second face landmark, and a third face landmark of the face, wherein a straight line on which the first face landmark or the second face landmark is located is parallel to a horizontal plane, and the third face landmark is not on the straight line;
    determining the face pose as meeting the preset condition in response to d1/d2 being within a preset range, wherein d1 is the distance between the first face landmark and the second face landmark, and d2 is the distance between the first face landmark and the third face landmark or the distance between the second face landmark and the third face landmark; and
    determining the face pose as not meeting the preset condition, in response to d1/d2 being not within the preset range.

3. The method of claim 2, wherein the first face landmark and the second face landmark are eyes, and the third face landmark is one of a mouth and a nose.

4. The method of claim 1, wherein the step of determining the face pose in each of the remaining face areas to remove the face areas with the face pose not meeting the preset condition comprises:

obtaining a pitch angle, a yaw angle and a roll angle of the face of the target in each of the remaining face areas; and comparing the obtained pitch angle, yaw angle, and roll angle with a preset standard pitch angle, standard yaw angle, and standard roll angle, respectively, to remove the face areas with the face pose not meeting the preset condition.

5. The method of claim 1, wherein the step of determining the mask wearing status of the target in each of the face areas comprises:

taking the confirmed mask wearing status of the target in the face area comprising the target with the confirmed mask wearing status as the mask wearing status of the target in each of the face areas, in response to the face of the target in the face area being the same as the face of the target in the face area comprising the target with the confirmed mask wearing status.

6. A mobile device, comprising:
a processor;
a memory coupled to the processor; and
one or more computer programs stored in the memory and executable on the processor;
wherein, the one or more computer programs comprise:
instructions for performing a face detection on an image to determine one or more face areas, wherein each of the face areas comprises a target determined as a face;
instructions for determining a mask wearing status of the target in each of the face areas, wherein the mask wearing status comprises a not-masked-well status, an unmasked status, and a masked status;
instructions for confirming the mask wearing status of the target in each of the face areas using a trained face confirmation model to remove the face areas comprising the target being mistakenly determined as the face and determining a face pose in each of the remaining face areas to remove the face areas with the face pose not meeting a preset condition, in response to determining the mask wearing status as the not-masked-well status or the unmasked status;
wherein the trained face confirmation model is a lightweight binary classification model; and
instructions for releasing an alert corresponding to the mask wearing status of the target in each of the remaining face areas;
wherein the one or more computer programs further comprise:
instructions for returning to confirm the mask wearing status of the target in each of the face areas in response to the face of the target in the face area being different from the face of the target in the face area comprising the target with the confirmed mask wearing status, and storing the confirmed mask wearing status; and
wherein the one or more computer programs further comprise:
instructions for determining one or more new face areas, and determining a mask wearing status of a target in each of the new face areas through a trained mask recognition network model, wherein each of the new face areas is (x, y+h*C, w, h), each of the original face areas is (x, y, w, h), x and y are the coordinates of pixel, w is the width of the image, h is the height of the image, and C is a preset percentage less than 1.

7. The mobile device of claim 6, wherein the instructions for determining the face pose in each of the remaining face areas to remove the face areas with the face pose not meeting the preset condition comprise:

instructions for determining a first face landmark, a second face landmark, and a third face landmark of the face, wherein a straight line on which the first face landmark or the second face landmark is located is parallel to a horizontal plane, and the third face landmark is not on the straight line;

instructions for determining the face pose as meeting the preset condition in response to d1/d2 being within a preset range, wherein d1 is the distance between the first face landmark and the second face landmark, and d2 is the distance between the first face landmark and the third face landmark or the distance between the second face landmark and the third face landmark; and instructions for determining the face pose as not meeting the preset condition, in response to d1/d2 being not within the preset range.

8. The mobile device of claim 7, wherein the first face landmark and the second face landmark are eyes, and the third face landmark is one of a mouth and a nose.

9. The mobile device of claim 6, wherein the instructions for determining the face pose in each of the remaining face areas to remove the face areas with the face pose not meeting the preset condition comprise:

instructions for obtaining a pitch angle, a yaw angle and a roll angle of the face of the target in each of the remaining face areas; and instructions for comparing the obtained pitch angle, yaw angle, and roll angle with a preset standard pitch angle, standard yaw angle, and standard roll angle, respectively, to remove the face areas with the face pose not meeting the preset condition.

10. The mobile device of claim 6, wherein the instructions for determining the mask wearing status of the target in each of the face areas comprise:

instructions for taking the confirmed mask wearing status of the target in the face area comprising the target with the confirmed mask wearing status as the mask wearing status of the target in each of the face areas, in response to the face of the target in the face area being the same as the face of the target in the face area comprising the target with the confirmed mask wearing status.

11. A non-transitory computer readable storage medium for storing one or more computer programs, wherein the one or more computer programs comprise:

instructions for performing a face detection on an image to determine one or more a plurality of face areas, wherein each of the face areas comprises a target determined as a face;

instructions for determining a mask wearing status of the target in each of the face areas, wherein the mask wearing status comprises a not-masked-well status, an unmasked status, and a masked status;

instructions for confirming the mask wearing status of the target in each of the face areas using a trained face confirmation model to remove face areas comprising a target being mistakenly determined as the face from the plurality of face areas, and determining a face pose in each of the remaining face areas to remove face areas with the face pose not meeting a preset condition from the remaining face areas, in response to determining the mask wearing status as the not-masked-well status or the unmasked status; wherein the trained face confirmation model is a lightweight binary classification model; and instructions for releasing an alert corresponding to the mask wearing status of the target in each of the remaining face areas;

wherein the one or more computer programs further comprise: instructions for returning to confirm the mask wearing status of the target in each of the face areas in response to the face of the target in the face area being different from the face of the target in the face area comprising the target with the confirmed mask wearing status, and storing the confirmed mask wearing status; and determining one or more new face areas, and determining a mask wearing status of a target in each of the new face areas through a trained mask recognition network model, wherein each of the new face areas is (x, y+h*C, w, h), each of the original face areas is (x, y, w, h), x and y are the coordinates of pixel, w is the width of the image, h is the height of the image, and C is a preset percentage less than 1.

12. The storage medium of claim 11, wherein the instructions for determining the face pose in each of the remaining face areas to remove the face areas with the face pose not meeting the preset condition comprise:

instructions for determining a first face landmark, a second face landmark, and a third face landmark of the face, wherein a straight line on which the first face landmark or the second face landmark is located is parallel to a horizontal plane, and the third face landmark is not on the straight line;

instructions for determining the face pose as meeting the preset condition in response to d1/d2 being within a preset range, wherein d1 is the distance between the first face landmark and the second face landmark, and d2 is the distance between the first face landmark and the third face landmark or the distance between the second face landmark and the third face landmark; and instructions for determining the face pose as not meeting the preset condition, in response to d1/d2 being not within the preset range.

13. The storage medium of claim 12, wherein the first face landmark and the second face landmark are eyes, and the third face landmark is one of a mouth and a nose.

14. The storage medium of claim 11, wherein the instructions for determining the face pose in each of the remaining face areas to remove the face areas with the face pose not meeting the preset condition comprise:

instructions for obtaining a pitch angle, a yaw angle and a roll angle of the face of the target in each of the remaining face areas; and instructions for comparing the obtained pitch angle, yaw angle, and roll angle with a preset standard pitch angle, standard yaw angle, and standard roll angle, respectively, to remove the face areas with the face pose not meeting the preset condition.

15. The storage medium of claim 11, wherein the instructions for determining the mask wearing status of the target in each of the face areas comprise:

instructions for taking the confirmed mask wearing status of the target in the face area comprising the target with the confirmed mask wearing status as the mask wearing status of the target in each of the face areas, in response to the face of the target in the face area being the same as the face of the target in the face area comprising the target with the confirmed mask wearing status.

16. The method of claim 1, wherein the target is selected by a graphic frame, each of the face areas is an area enclosed by the graphic frame in the image, and after the target is selected, the image with the graphic frame is displayed.

17. The method of claim 1, wherein normal faces are used as positive samples for a training of the lightweight binary classification model, a back of a head, a hand, an incomplete detected face and a cloth are used as negative samples for the training of the lightweight binary classification model, and a ratio of the positive samples to the negative samples is kept as larger than 0.5 and less than or equal to 1.

18. The method of claim 1, wherein the alert corresponding to the mask wearing status is at least one of reporting the mask wearing status of the target in each of the remaining face areas, and marking the mask wearing status on the target in each of the remaining face areas through a preset mark.

* * * * *